Aug. 22, 1961   P. SCHLUMBOHM   2,997,332
FAMILY AUTOMOBILE
Original Filed June 24, 1950   4 Sheets-Sheet 3
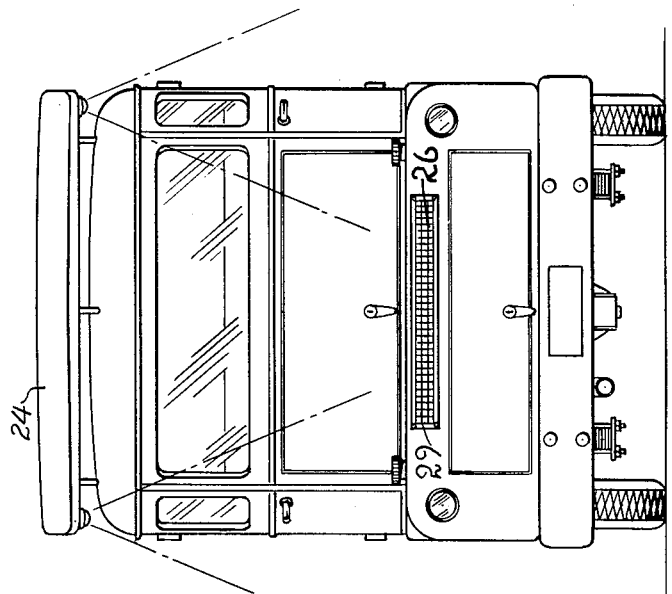
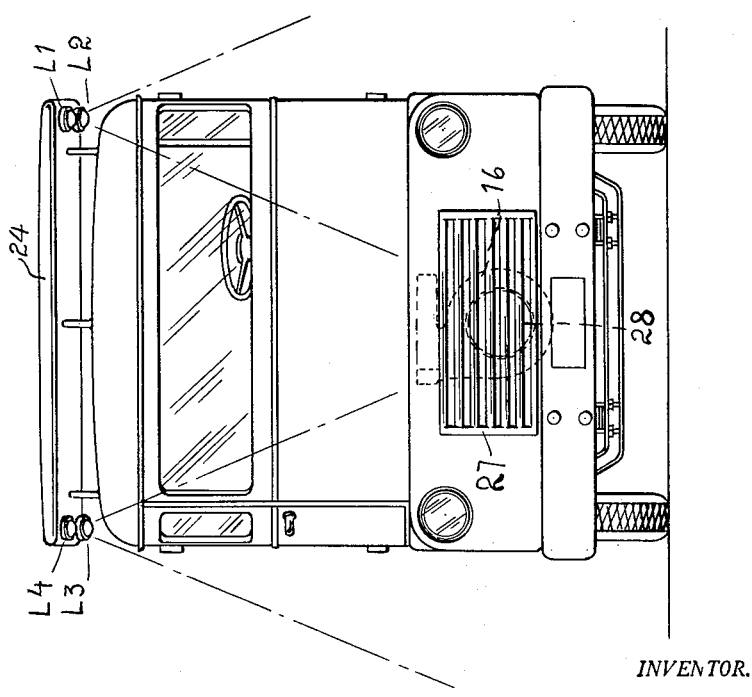
INVENTOR.

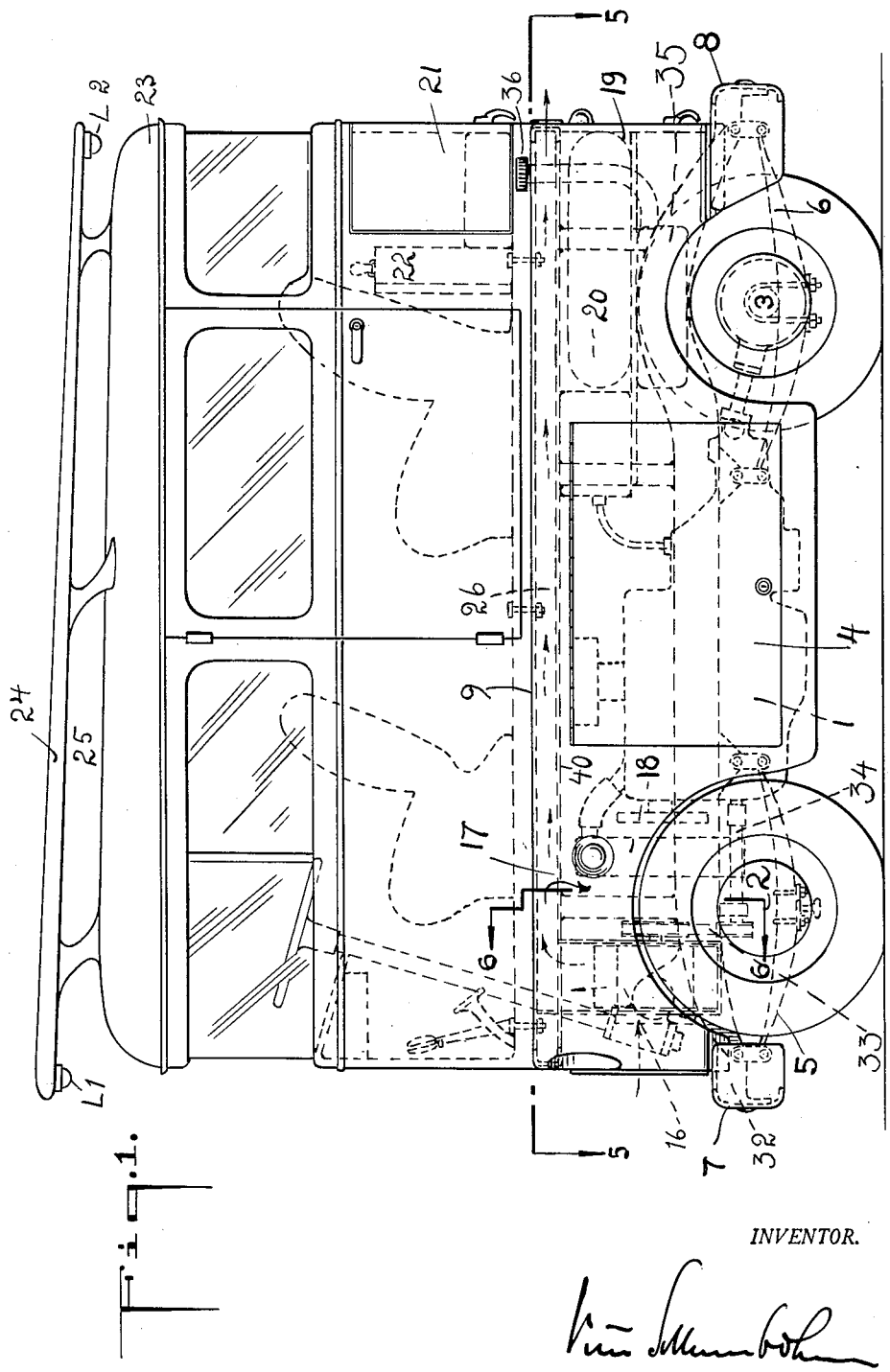

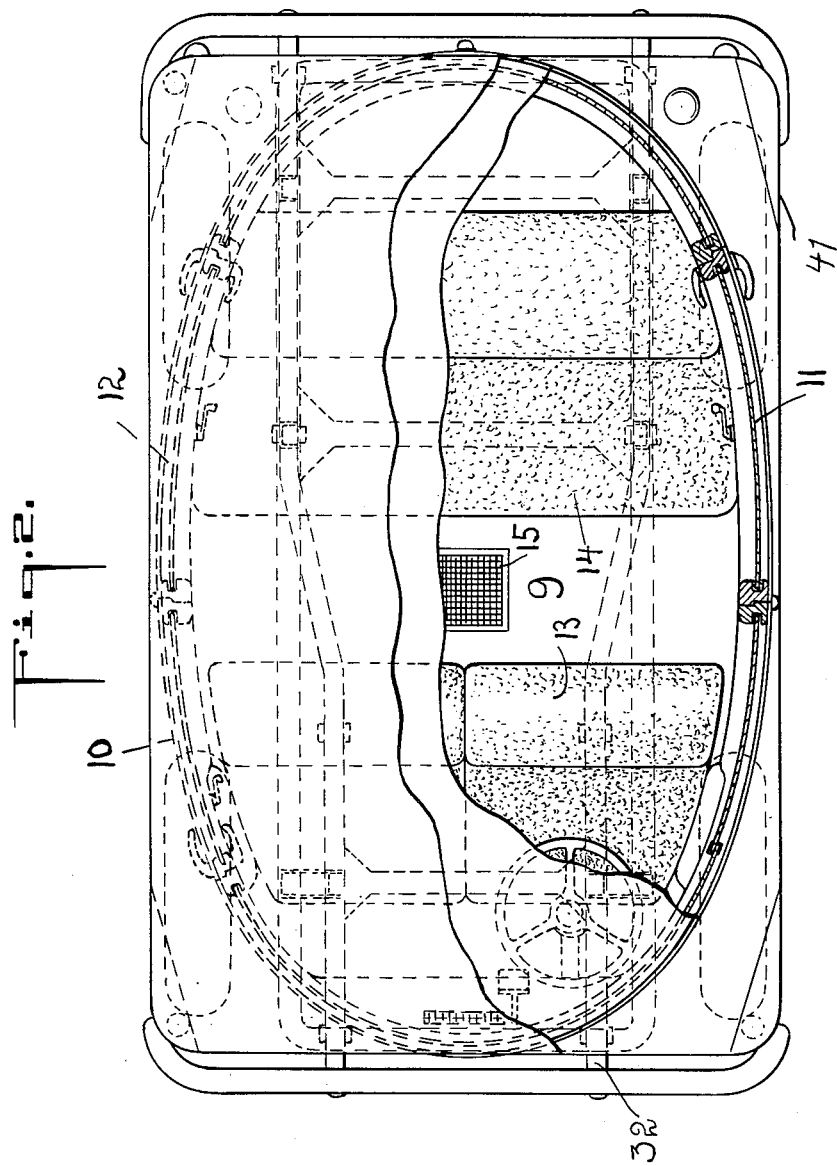

Aug. 22, 1961 P. SCHLUMBOHM 2,997,332
FAMILY AUTOMOBILE
Original Filed June 24, 1950 4 Sheets-Sheet 4
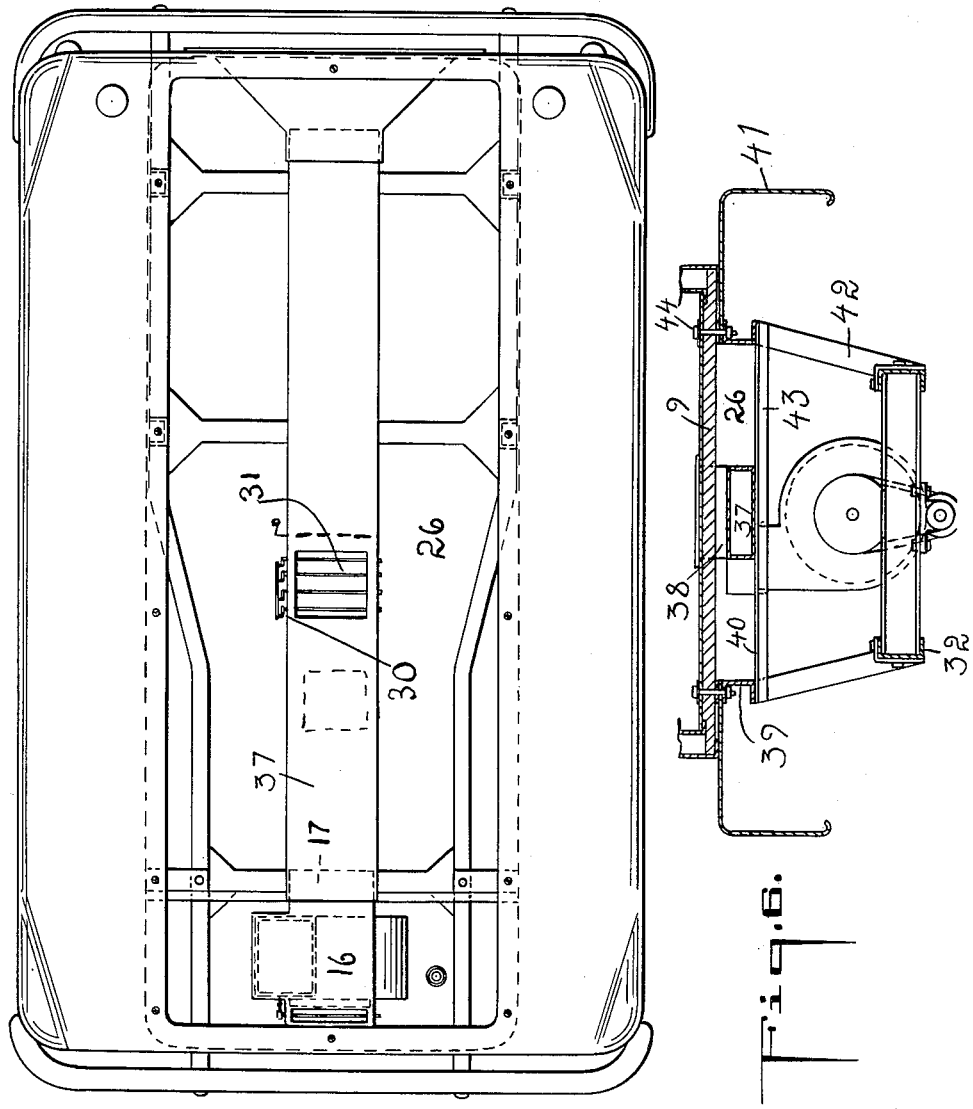
INVENTOR.

United States Patent Office 2,997,332
Patented Aug. 22, 1961

2,997,332
FAMILY AUTOMOBILE
Peter Schlumbohm, 41 Murray St., New York 7, N.Y.
Original application June 24, 1950, Ser. No. 170,192, now Patent No. 2,734,588, dated Feb. 14, 1956. Divided and this application Feb. 8, 1956, Ser. No. 564,296
2 Claims. (Cl. 296—28)

The present application is a division of my copending application, Serial No. 170,192, filed June 24, 1950, and now Patent No. 2,734,588. The invention relates to automobiles, and more specifically it refers to the "family-car," in contrast to trucks or buses.

The new family car of my invention has the following features:

(1) The overall length is only 60% of the length of a conventional automobile with the same motor power and the same passenger space.

(2) The passenger space is arranged above the motor space and occupies the entire wheel base.

(3) The motor is arranged between the front and rear axles, as low as road clearance allows.

(4) Two frames are provided one above the other. The lower frame has conventional structure but is shortened to substantially the length of the wheel base. The upper frame, also of wheel base length is spaced from the lower frame and carries the body for say six passengers like an upper deck.

(5) Insulating means and an air channel for forced draft prevent heat from the motor section from annoying the passengers.

(6) The streamlining is that of a ship's funnel. The walls and windows of the passenger compartment rise vertically from a floor panel of oval shape. The roof is plane and pitched downward towards the rear end for draining rain and snow.

(7) Crash safety: The passenger space—due to its high level above the road—is rather safe in a crash.

(8) Visibility for driver and passengers is excellent.

(9) Maneuverability: This shorter car is a boon to traffic. Parking is simple, and U-turns are simple.

(10) Accessibility for repairs: The mechanic is not separated from the motor by a wheel; he stands between the front wheel and the rear wheel. For important repairs and replacement, the entire passenger compartment can be disconnected from the upper frame and lifted off as an entity by crane.

The invention is illustrated, by way of example, in FIG. 1 to FIG. 6 of the accompanying drawings.

FIG. 1 is a side view of a passenger car, showing the seats, the air-duct and the mechanism in dotted lines.

FIG. 2 is a top view of FIG. 1, partly broken away and partly in horizontal section.

FIG. 3 is a front view of the passenger car shown in FIG. 1, showing the front intake of the air duct. An air blower is indicated in dotted lines. Also indicated are the beams of light directed downward from the roof lamps.

FIG. 4 is a rear view of the passenger car shown in FIG. 1, showing the exhaust grill of the air duct.

FIG. 5 illustrates as a top view a section along line 5—5 of FIG. 1, omitting parts in order to show details of the two superposed frames.

FIG. 6 is a vertical section along the lines 6—6 of FIG. 1, showing partly in cross section and partly in view details of FIG. 1.

The drawings show that it is possible to build a car with a short wheel base length and that it is further possible to limit the length of the car substantially to this wheel base length without sacrificing space for the motor or space for the passengers computed on a comparable car.

In FIG. 1 the motor 1 is arranged between the front axle 2 and the rear axle 3. I am showing in this example wheels of standard diameter. However, it would be advantageous to apply larger wheels so that the level of the axle will be higher above the road. This will lower the center of gravity of the car with reference to the axles.

The motor is accessible by panel 4. Elliptic springs 5, 6 dictate the overall length of the lower frame 32, which is supplemented by front bumper 7 and rear bumper 8.

In front of the motor 1 is its radiator 18 and in front of the radiator is a centrifugal blower 16. The blower 16 is driven by a belt 33 which takes off from an extension 34 of the crank shaft of the motor. Behind the motor, over the rear axle, is space for a gasoline tank 35 closed by the tank cap 36 and for a compartment 19 for a spare tire 20. The motor compartment is covered by a top panel 40.

Above the motor compartment is an air duct space 26, which extends under the floor panel 9 of the passenger compartment over the entire length of the car and over a substantial part of its width. As shown in FIG. 3 and FIG. 4, this air duct 26 has an air intake 27 in the front wall of the car and an air outlet 29 in the rear wall of the car.

During driving, air will be rammed into air intake 27, pass through duct 26 and leave through grill 29.

However, in order to provide heat dissipation during the standstill or slow motion of the car, forced draft is provided by a powerful blower 16.

The air intake 28 of the blower receives air through air intake 27 and the outlet of the blower is equipped with a conventional pressure duct 37, arranged in the air channel 26, from which the compressed air can be distributed by conventional means, such as louvres 30 or a gate 31, to enter the general air channel 26 for cooling purposes to protect the passenger space against the heat from the motor space, or can be directed through branch duct 17 against radiator 18 or through a branch duct 38 through grill 15 into the passenger compartment.

I allot 5 H.P. to driving the blower 16. This gives about 2,000 cu. ft. per minute at about 4" water column pressure. This is adequate for a six passenger car.

The provision of an air channel 26 is greatly facilitated by a second frame 39, on which the floor panel 9 of the passenger compartment is mounted. FIG. 6 shows the details of this double frame structure. This upper frame 39 also carries the skirt 41 of the car. The upper frame 39 is supported by the base frame 32 by means of uprights 42. Horizontal cross beams 43 support panels 40, which cover the motor compartment.

The provision of the upper frame 39 makes it possible to mount on it a passenger compartment which can be lifted off its upper frame as an entity by unfastening bolts 44.

As shown in FIG. 2 this passenger compartment has a floor panel 9 of oval shape. From this floor panel, side walls rise vertically. One front door 10 and two rear doors 11, 12 are provided. The front seats 13 will seat the driver and one of two passengers and the rear seats 14 will seat three passengers. By omitting the left front door the driver enjoys a view unrestricted by any posts on the left side. A luggage compartment 21 is shown in FIG. 1 as providing space for luggage 22. Making the walls of the passenger space vertical and providing for the passenger compartment the streamlined profile of a ship's funnel should make manufacturing simpler than providing the intricate curved metal sheets now used for streamlined passenger cars.

The roof 23 of the passenger compartment is pitched downward toward the rear end of the car. A false roof 24 is provided to reflect the radiant sun heat. The air channel 25 between roof 23 and the false roof 24 allows air to cool both the roof 23 and the false roof 24.

Following my invention I designed the false roof 24 with rectangular contours so that the corners of the false roof 24 overhang the oval passenger compartment. This allows to install downwardly directed lights L1, L2, L3 and L4, which facilitates parking.

It is a matter of detail to arrange for some recessed steps in the lower side walls of the car to allow passengers to step up into the passenger compartment.

I claim as my invention:

1. A family automobile having two axles, four wheels, a chassis frame and a passenger compartment mounted thereon, said passenger compartment being a box having a floor panel of elliptical circumference, side walls joining said floor panel at its circumference and rising therefrom vertically at an angle of 90°, a roof panel substantially congruent with said floor wall and joining at its elliptical circumference said vertical side walls, the elliptically contoured floor panel extending substantially over the entire wheelbase, its shorter axis corresponding substantially to the width of the car; said elliptical roof panel carrying a false roof of rectangular shape and of substantially its own width and length, said false roof carrying in its four corner sections, which extend beyond the elliptical roof panel, downwardly directed lamps, whereby parking in the dark is facilitated.

2. A family automobile of substantially rectangular overall dimensions, with a passenger compartment having overall dimensions smaller than said rectangular dimensions, characterized by a false roof of rectangular overall dimensions, said false roof having four corner sections which extend beyond the overall dimensions of the passenger compartment, said four corner sections being equipped with downwardly-directed lamps, whereby parking in the dark is facilitated.

References Cited in the file of this patent

UNITED STATES PATENTS

| | | |
|---|---|---|
| D. 154,760 | Flowers | Aug. 9, 1949 |
| D. 165,195 | Schlumbohm | Nov. 13, 1951 |
| 601,440 | Holmes | Mar. 29, 1898 |
| 766,191 | Moakler | Aug. 2, 1904 |
| 1,223,465 | Armstrong | Apr. 24, 1917 |
| 1,526,258 | Trasky | Feb. 10, 1925 |
| 1,543,877 | Saunders | June 30, 1925 |
| 1,648,505 | Persu | Nov. 8, 1927 |
| 1,733,007 | Dabl | Oct. 22, 1929 |
| 1,781,322 | Delling | Nov. 11, 1930 |
| 2,101,057 | Fuller | Dec. 7, 1937 |
| 2,161,006 | Bixel et al. | June 6, 1939 |
| 2,231,293 | Norman | Feb. 11, 1941 |
| 2,266,769 | Kramer | Dec. 23, 1941 |
| 2,329,545 | Ledwinka | Sept. 14, 1943 |
| 2,361,924 | Boynton | Nov. 7, 1944 |
| 2,418,294 | Flogaus et al. | Apr. 1, 1947 |
| 2,734,588 | Schlumbohm | Feb. 14, 1956 |